United States Patent
Hardy et al.

(10) Patent No.: US 10,069,928 B1
(45) Date of Patent: Sep. 4, 2018

(54) TRANSLATING REQUESTS/RESPONSES BETWEEN COMMUNICATION CHANNELS HAVING DIFFERENT PROTOCOLS

(71) Applicant: Amazon Technologies, Inc., Seattle, WA (US)

(72) Inventors: Steven Alexander Hardy, Delft (NL); Mark Swaanenburg, Rijswijk (NL); Enrico Huijbers, Rotterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 14/601,464

(22) Filed: Jan. 21, 2015

(51) Int. Cl.
G06F 15/16 (2006.01)
H04L 29/08 (2006.01)
H04L 29/06 (2006.01)

(52) U.S. Cl.
CPC .......... H04L 67/2833 (2013.01); H04L 67/02 (2013.01); H04L 67/142 (2013.01); H04L 67/40 (2013.01)

(58) Field of Classification Search
CPC ...... H04L 67/2823; H04L 69/08; H04L 67/28
USPC .................................. 709/230, 238
See application file for complete search history.

(56) References Cited

U.S. PATENT DOCUMENTS

| | | | | |
|---|---|---|---|---|
| 9,317,843 B2* | 4/2016 | Bradley | ............ | G06Q 20/1235 |
| 2002/0161907 A1* | 10/2002 | Moon | .................... | H04L 69/08 |
| | | | | 709/230 |
| 2004/0255008 A1* | 12/2004 | Olsen | .................... | G06F 1/3209 |
| | | | | 709/220 |
| 2004/0255048 A1* | 12/2004 | Lev Ran | ................ | G06F 9/546 |
| | | | | 709/249 |
| 2006/0041688 A1* | 2/2006 | Wright | ............. | H04L 29/06027 |
| | | | | 709/249 |
| 2006/0080419 A1* | 4/2006 | Patrick | ................. | H04L 41/082 |
| | | | | 709/220 |
| 2007/0156919 A1* | 7/2007 | Potti | ........................ | G06F 8/67 |
| | | | | 709/238 |
| 2008/0059787 A1* | 3/2008 | Hohenberger | ....... | H04L 9/3013 |
| | | | | 713/153 |
| 2009/0204964 A1* | 8/2009 | Foley | ..................... | G06F 21/53 |
| | | | | 718/1 |
| 2012/0233668 A1* | 9/2012 | Leafe | .................... | G06F 9/5022 |
| | | | | 726/4 |
| 2014/0108474 A1* | 4/2014 | David | .................... | G06F 17/30 |
| | | | | 707/827 |
| 2014/0201838 A1* | 7/2014 | Varsanyi | ............ | H04L 63/1425 |
| | | | | 726/23 |

* cited by examiner

*Primary Examiner* — Phuoc Nguyen
(74) *Attorney, Agent, or Firm* — Klarquist Sparkman, LLP

(57) ABSTRACT

Client applications that use an open session connection on a unidirectional communication channel, including a plurality of requests, can have such requests aggregated and transformed into individual requests for transmission over a bidirectional communication channel. In at least one embodiment of a proxy disclosed herein, an RPC stream is transformed into multiple individual HTTP requests. By using individual HTTP requests, such requests can be handled easily by existing HTTP infrastructure, such as proxies and HTTP servers. In another embodiment, a plurality of RPC requests can be embedded within an individual HTTP request so as to ensure that the RPC requests are not modified.

19 Claims, 8 Drawing Sheets

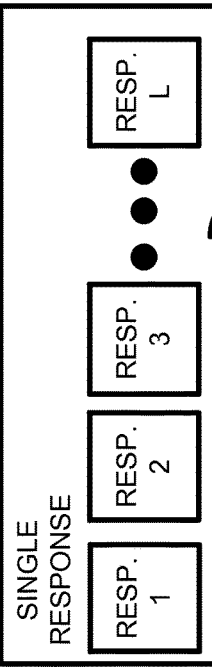
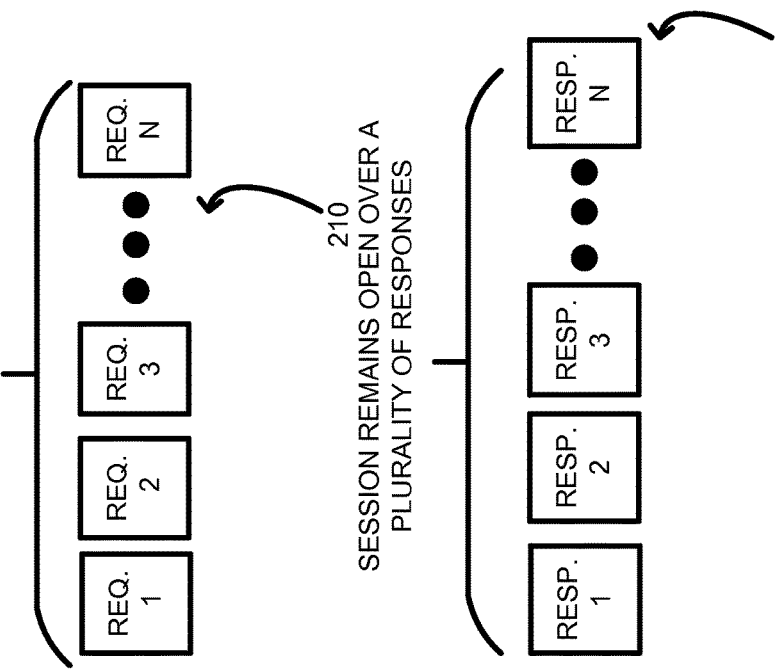
FIG. 2

TRANSLATING REQUESTS/RESPONSES BETWEEN COMMUNICATION CHANNELS HAVING DIFFERENT PROTOCOLS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In networking, a session is an interactive information interchange between two or more communicating devices (e.g., a server and a client). A session is typically stateful, meaning that at least one of the communicating parts needs to save information about the session history in order to be able to communicate, as opposed to stateless communication, where the communication includes independent requests with responses. Client-side sessions typically use cookies to maintain state without storing data on the server. When presenting a dynamic web page, the server sends the current state data to the client in the form of a cookie. The client saves the cookie and sends it back to the server with a new request. The server uses the data to remember the state of the application for that specific client and generate an appropriate response.

The session can be initiated using a variety of protocols available for network communications. For example, Internet browsers typically use the Hypertext Transport Protocol (HTTP) as the primary means of browsing the World Wide Web. Other protocols can be used. For example, some applications, such as email applications, use a remote procedure call (RPC) as an inter-process communication that allows a computer program to cause a subroutine or procedure to execute in another computer. Thus, using RPC, the programmer writes the same code whether the subroutine is local to the executing program, or remote.

Adapting RPC-based applications to a cloud environment can be challenging. For example, some applications are designed to communicate with a single server, while a cloud environment has potentially thousands of servers and is designed to scale to any desired size. Additionally, RPC communications can leave a session open for extended periods, which ties up network resources unnecessarily. In a specific example, some applications set up two HTTP connections or channels: one for outgoing requests to the server, and one for incoming responses from the server. In particular, existing RPC connections can use a two-channel half-duplex HTTP connection. Each channel is a non-standard 'RPC_IN_DATA' or 'RPC_OUT_DATA' HTTP method, and the Content-Length is always 1 GB. Such a structure for a cloud-based environment is inefficient.

BRIEF DESCRIPTION OF THE DRAWINGS

FIG. 2 is an example of requests and responses being transformed from a unidirectional protocol to a bidirectional protocol.

DETAILED DESCRIPTION

In one embodiment, client applications that use an open session connection, such as RPC, can have requests translated into individual HTTP requests. In at least one embodiment of a proxy disclosed herein, an RPC stream is transformed into multiple individual HTTP requests that conform to standard HTTP request used in most systems (e.g., a HTTP POST request). By using individual HTTP requests, such requests can be handled by existing HTTP infrastructure, such as proxies and HTTP servers. In another embodiment, the RPC requests themselves can be embedded within an individual HTTP request so as to ensure that the RPC requests are not modified.

Figure 1:
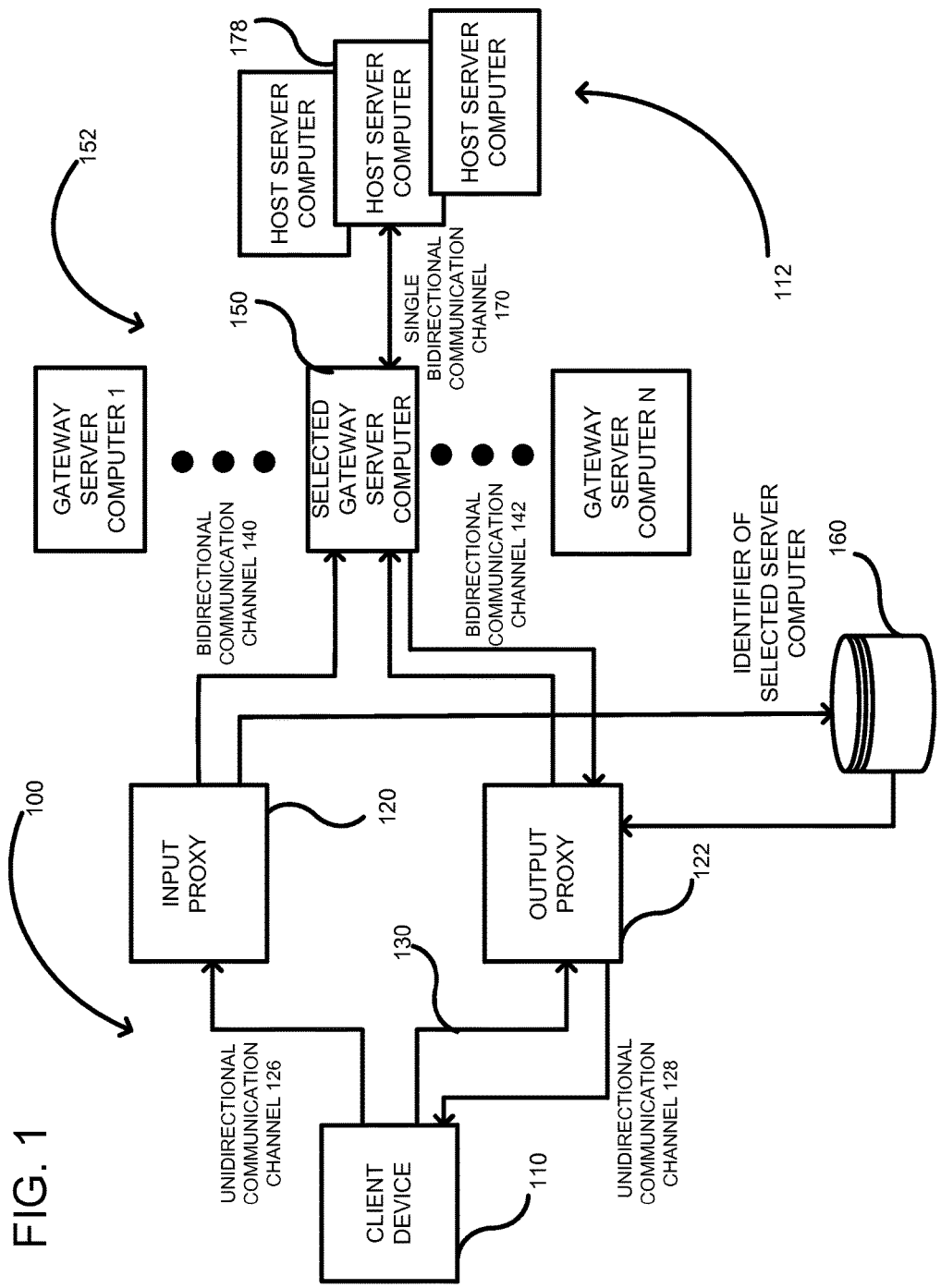
FIG. 1 is a system for translating requests and responses between different protocols.

An example system 100 is shown in FIG. 1 for translating requests and responses between different protocols. A client device 110 can include a client application (not shown) that generates requests to backend host server computers 112 and that receives responses to the requests. The client device 110 can be virtually any platform (e.g., cell phone, smartphone, handheld computer, Personal Digital Assistant (PDA), personal computer, etc.) and the application can be any desired application. In one example, the application can be an email/calendaring application. Communication with the backend host server computers 112 can be accomplished via an input proxy 120 and an output proxy 122. In a typical example, the application executing on the client device 110 can request a DNS lookup for a domain name, as is well understood in the art. A list of potential proxy addresses can be received by the application. The application executing on the client device 110 can select one of the proxies and establish two unidirectional communication sessions with input/output proxies 120, 122. The first communication session between the client device 110 and the input proxy 120 can use a unidirectional communication channel 126. The unidirectional communication channel 126 can have corresponding sockets (not shown) on the client device 110 and the input proxy 120, a corresponding socket identifier, etc. Using the unidirectional communication channel 126, requests can be transmitted from the client device 110 to the input proxy 120 using a unidirectional communication protocol, such as Remote Procedure Call (RPC) protocol. A second unidirectional communication channel 128 can also be established with output proxy 122. Like channel 126, the second unidirectional communication channel 128 can have corresponding sockets on the client device 110 and the output proxy 122. The sockets used for each channel 126, 128 can be separate and independent (each having a different identifier). At 130, it is shown that the client device 110 can initiate establishment of the channel 128 with the output proxy 122. However, the channel 128 is considered unidirectional as after the channel is established, responses are sent from the output proxy 122 to the client device 110. It should also be noted that the input and output proxies 120, 122 can be positioned on a same server computer or different server computers.

Each communication channel 126, 128 has its own independent communication session using a unidirectional communication protocol. Typically, the channels 126, 128 remain open for an extended period of time. In one example, both channels remain open while multiple requests are transmitted from the client device 110 to the input proxy 120. Additionally, channel 126 remains open while responses to the requests are received on channel 128. Even after the last response is received, the channels can continue to remain open and the communication sessions can remain established.

The input and output proxies 120, 122 can also establish independent bidirectional communication channels 140, 142. The channels 140, 142 can be used to communicate with a gateway server computer 150 using a bidirectional communication protocol, such as a Hypertext Transfer Protocol (HTTP). The input proxy 120 can also act as a load balancer by selecting the gateway server computer 150 from a plurality of candidate gateway servers, shown generally at 152. Various techniques can be used for load balancer selection, such as random selection, round robin, weighted selections, dynamic ratio (based on performance), fastest node (server with the least number of sessions), etc. Once the server computer 150 is selected, a socket can be opened for channel 140 on both the input proxy 120 and the gateway server computer 150. The input proxy 120 can then write an identifier (e.g., an address and/or GUID) of the server computer 150 to a database 160, which is accessible (shared) between the input proxy 120 and the output proxy 122. In the case where the input proxy 120 and the output proxy 122 are on the same server computer, the database 160 can be shared storage on the server computer itself. As described further below, the input proxy 120 can aggregate a plurality of requests received using the unidirectional communication protocol into a single request transmitted using the bidirectional communication protocol. In one example, a plurality of RPC requests can be received and transformed into a single HTTP POST request. After the HTTP request is transmitted to the selected gateway server computer 150, the bidirectional communication channel 140 can be torn down so as to conserve network resources. In one example, conversion of a plurality of RCP requests to a single HTTP request allows the channel 140 to be quickly established and torn down and a single transmission is passed over the network, reducing the overall time needed to transmit the requests.

The selected gateway server 150 can receive the single request from the input proxy 150 and transmit it using a single bidirectional communication channel 170 (e.g., HTTP) to a backend host server computer 178, which is a selected one of the plurality of backend host server computers 112. The gateway server computer 150 can select the host server computer 178 using the techniques described above. The host server computer 178 can unpack the plurality of requests that were encapsulated in the single request by the input proxy 120 and generate a plurality of responses that are returned using the bidirectional communication channel 170.

The output proxy 122 can monitor the database 160 for when the input proxy 120 loads an identifier of the selected gateway server computer. Upon determining that a request has been transmitted by the input proxy to the determined gateway server computer, the output proxy can establish the bidirectional communication channel 142 to retrieve one or more responses. The responses can be aggregated in the gateway server computer 150 and sent as a single response back to the output proxy 122 (e.g., such as using a single HTTP GET request). After the GET request is completed, the channel 142 can be torn down and the sockets terminated. The output proxy 122 can parse the data portion of the request to divide out the individual RCP responses. The individual responses can then be transmitted over the unidirectional communication channel 128 using the unidirectional communication protocol, which remains open.

Overall, the unidirectional communication channels 126, 128 maintain the channels open for extended periods of time, while the bidirectional communication channels 140, 142 open and terminate after every request. By transforming requests from a unidirectional communication protocol to a bidirectional communication protocol, network bandwidth is conserved. Additionally, resources that use bidirectional communication protocols (such as HTTP) are well developed and easy to acquire.

FIG. 2 is an example of requests and responses automatically transformed between a unidirectional protocol and a bidirectional protocol. On the left side of FIG. 2, a plurality of requests 210 are shown that can be transmitted from a client device to an input proxy. In this example, there are N requests shown in a series of requests, where N is any number. As shown at 212, the plurality of requests 210 are transmitted to the input proxy during a single communication session. In one embodiment, the plurality of requests are transmitted on a unidirectional communication channel using a unidirectional communication protocol, such as RPC. By "unidirectional" it is understood by those skilled in the art that there can be some back and forth handshaking between the client device and the input proxy in conformance with the protocol, but the requests and associated data are transmitted only from the client to the input proxy. Thus, a communication session is established between the client and input proxy, such as opening communication sockets on both the client and input proxy without terminating the sockets as all of the requests 210 are transmitted. Typically, each individual request has its own header and data portions and can be processed individual by a host server computer.

On the right side of FIG. 2, a single request is generated by the input proxy as shown at 220. In this example, M (where M is any integer number less than or equal to N) requests are inserted into the request 220. Although not shown, other of the N plurality of requests 210 can be transmitted in one or more different bidirectional communication sessions. Nonetheless, in the illustrated example, the single request can have a header in conformance with a bidirectional communication protocol, such as HTTP. A portion (M) of the plurality of requests 210 can be inserted into a data section of the request 220 Thus, M of the plurality of requests 210 (including the individual headers) are aggregated into the single request 220, with a common header in conformance with a bidirectional communication protocol. The single request can be transmitted to a destination host server computer (such as is shown at 178 in FIG. 1) for generating a response to the request. The host server computer can parse the single request to extract the individual requests 210 and process the requests individually. For example, the data portion of the request 220 can be searched for each individual request header to extract or unwrap the requests 210. As shown at 222, to transmit the single request, the input proxy opens a bidirectional communication session, transmits the response and then terminates the bidirectional communication session. In one embodiment, a socket is opened to establish the communication session and then closed once the request 220 is transmitted.

The individual responses can be received and aggregated into a single response 230 adapted for the bidirectional communication protocol. Typically, the responses are not all received at the same time. Accordingly, in this example, L (wherein L is any integer number less than or equal to N) responses are received. For example, the output proxy can retrieve multiple responses in the gateway server computer and the multiple responses can be aggregated into the single response 230 in conformance with the bidirectional communication protocol. A bidirectional communication session can be opened, the single response 230 transmitted to the output proxy, and then the communication session can be terminated. All the while, a unidirectional communication session can be open between the output proxy and the client device waiting for the responses. The responses 240 can be parsed from the single response and transmitted by the output proxy to the client device. It should be noted that a period of time that the bidirectional communication session is open is shorter than that of the unidirectional communication session so as to conserve network resources. Other of the N responses (not shown) can be received and transmitted in one or more additional bidirectional communication sessions.

Figure 3:
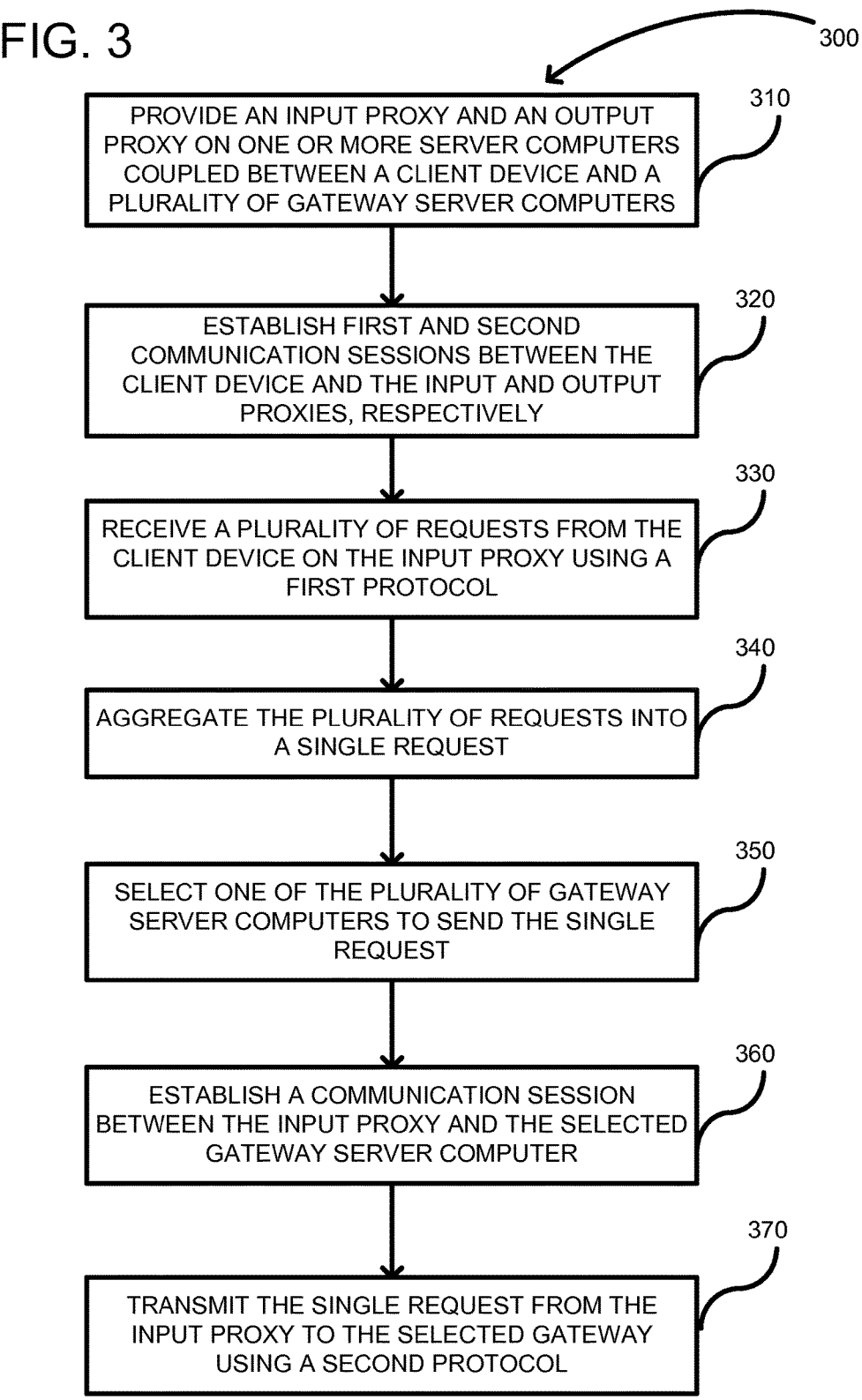
FIG. 3 is a flowchart of an embodiment for translating requests between different protocols.

FIG. 3 is a flowchart 300 of an embodiment for translating requests between different protocols. In process block 310, an input and output proxy are provided on one or more server computers. Typically, the input and output proxies are located on a same server computer, but operate independently in that each establishes a separate unidirectional communication session with the client device. The input and output proxies are typically positioned between the client device and a plurality of gateway server computers. In process block 320, first and second communication sessions can be established. A first communication session can be established on a unidirectional communication channel between the client device and an input proxy. A second communication session can be established on a unidirectional communication channel between the client device and an output proxy. Thus, the client device opens two unidirectional communication sessions to send and receive responses from the input and output proxies. In process block 330, a plurality of requests are received from the client device on the input proxy using a first protocol on the unidirectional communication channel. Each of the plurality of requests generally includes a header portion and a data portion. The plurality of requests can be in accordance with a unidirectional communication protocol, such as RPC. The input proxy can buffer the requests until a predetermined number of requests are received, or until there is a sufficient opportunity to send the requests onto a gateway server or other backend server used to service the requests. In process block 340, the input proxy aggregates the plurality of requests into a single request. The aggregation can include storing the plurality of requests in a data portion of the single request and generating a header for the single request. Typically, the input proxy is occupied with other tasks as the requests accumulate, and as soon as the input proxy is free to process the requests, it aggregates any pending accumulated requests for transmission. In process block 350, the input proxy can select one of the gateway servers from a plurality of possible gateway servers. Selection can be accomplished in a variety of ways, as already described. In process 360, a communication session is established between the input proxy and the selected gateway to generate a bidirectional communication channel. Finally, in process block 370, the single request is transmitted over the bidirectional communication channel using the bidirectional communication protocol to the selected gateway server computer. The gateway server computer can then transmit the request using a bidirectional communication channel to a backend host server computer, either directly or indirectly. The backend server computer can unwrap (extract) the plurality of requests by parsing the single request. Each independent request of the plurality can be processed separately using the backend host server computer.

Figure 4:
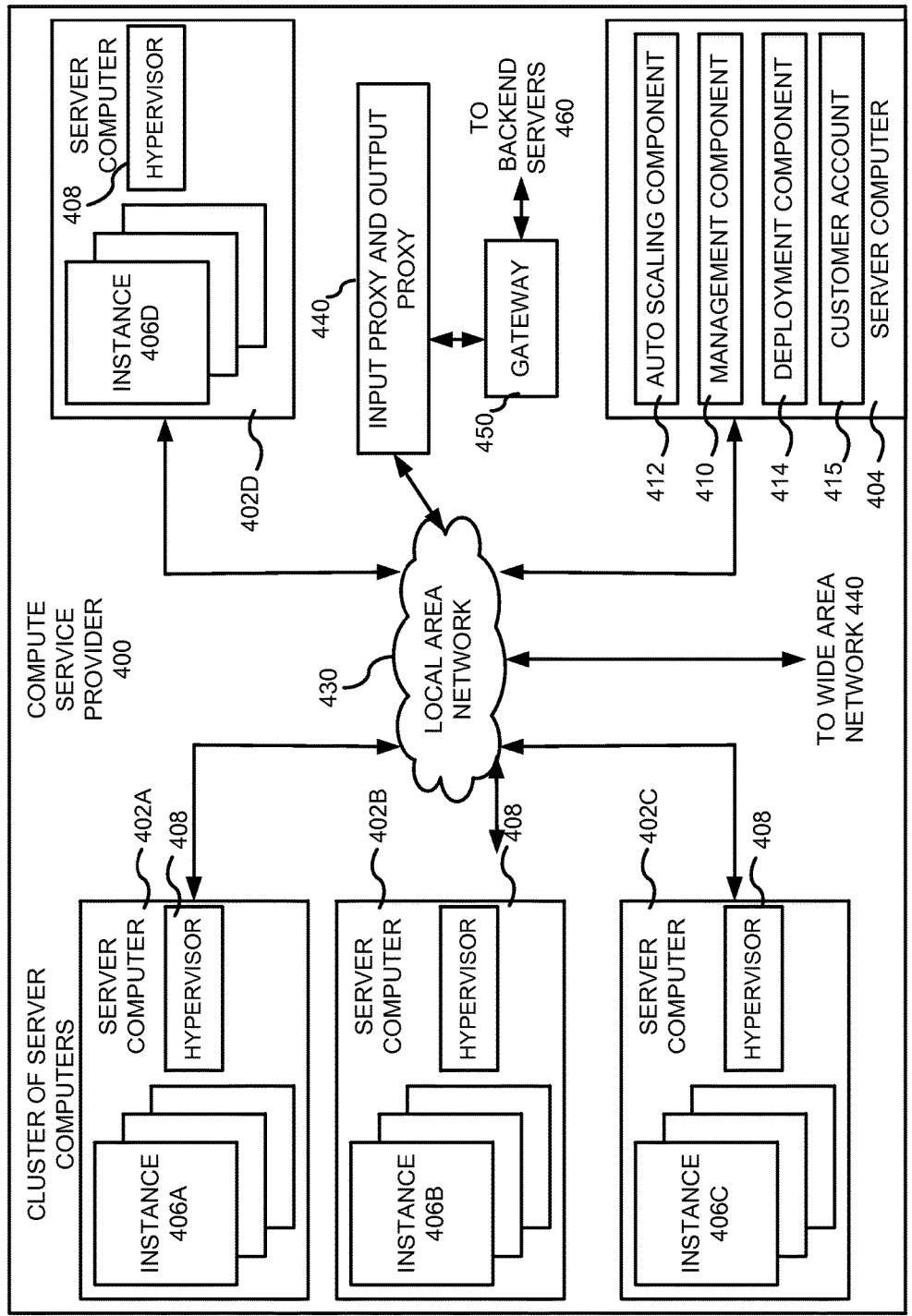
FIG. 4 is an example system diagram showing a plurality of virtual machine instances running in the multi-tenant environment that can connect to input and output proxies for translating requests and responses between different protocols.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications. Those skilled in the art will understand that the instances 406 can act as a client device, such as client device 110 in FIG. 1. It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein. A client device, such as shown at 110 of FIG. 1, can also connect to the network 430 while being located external to the compute service provider 400. An input proxy and output proxy can be located on a server computer 440 as part of the compute service provider. The input and output proxies can communicate with the client device through the network 430 in order to receive requests and deliver responses, as already described. The input and output proxies can also communicate through a gateway 450 for transmission to backend servers 460. Typically, the input and output proxies 440 and the gateway 450 are separately executed in one or more instances 406 running on server computers 402 in the compute service provider 400.

Figure 5:
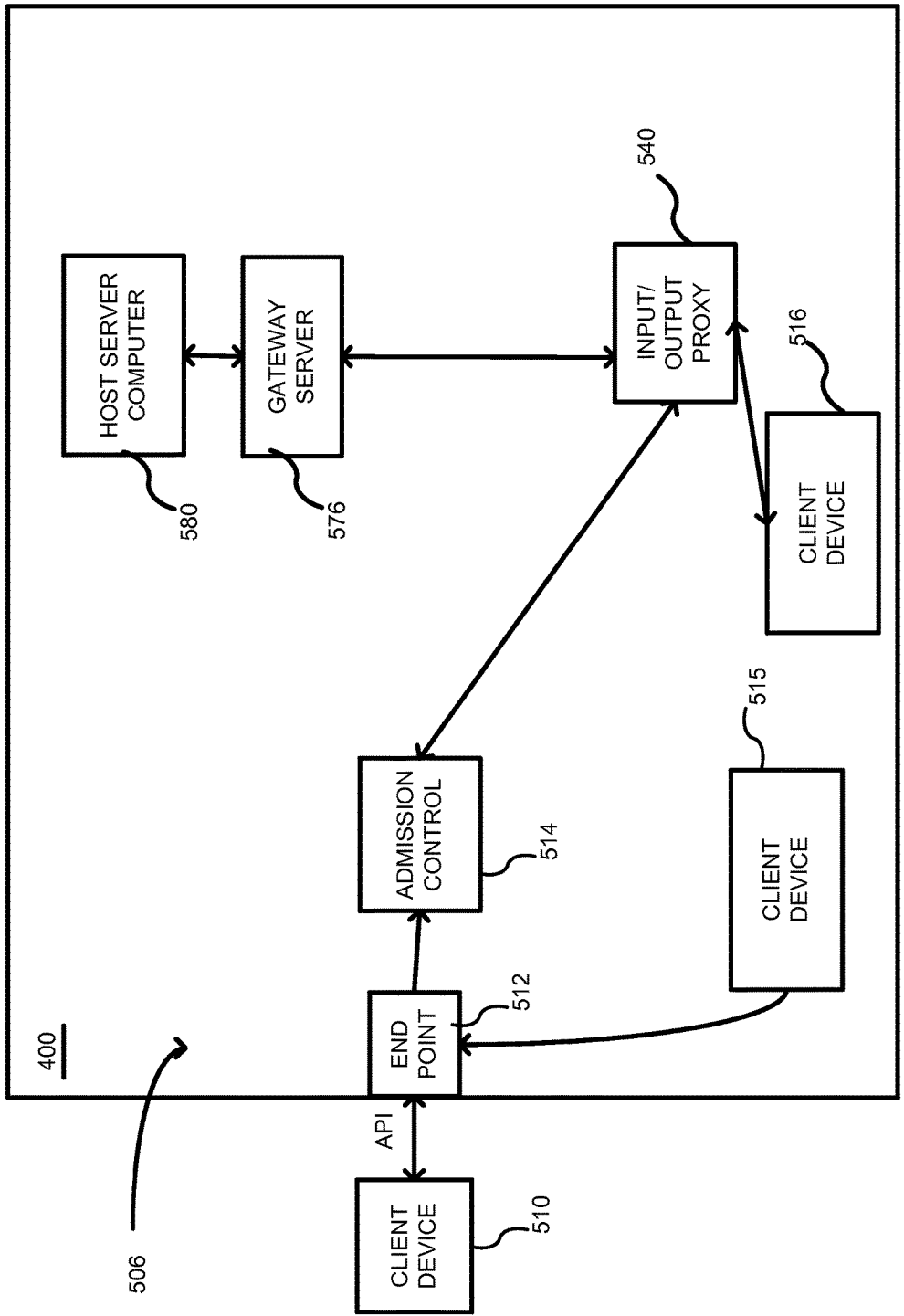
FIG. 5 shows further details of an example system including a plurality of management components associated with a control plane that can be used in translating requests between different protocols.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512. Still other client devices 516 can bypass admission control and communicate directly with the input/output proxy 540.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. Requests from client devices 510 and/or 515 can pass through admission control to be received at the input/output proxies 540. Using the technology described herein, the input proxy 540 can select an appropriate gateway server computer 576 from a plurality of gateway server computers and transmit the client request to a selected host server computer 580, which is one of a plurality of host server computers. Generally, any of the components can be subsumed into other components. For example, the admission control 514 can be within the input/output proxy 540.

Figure 6:
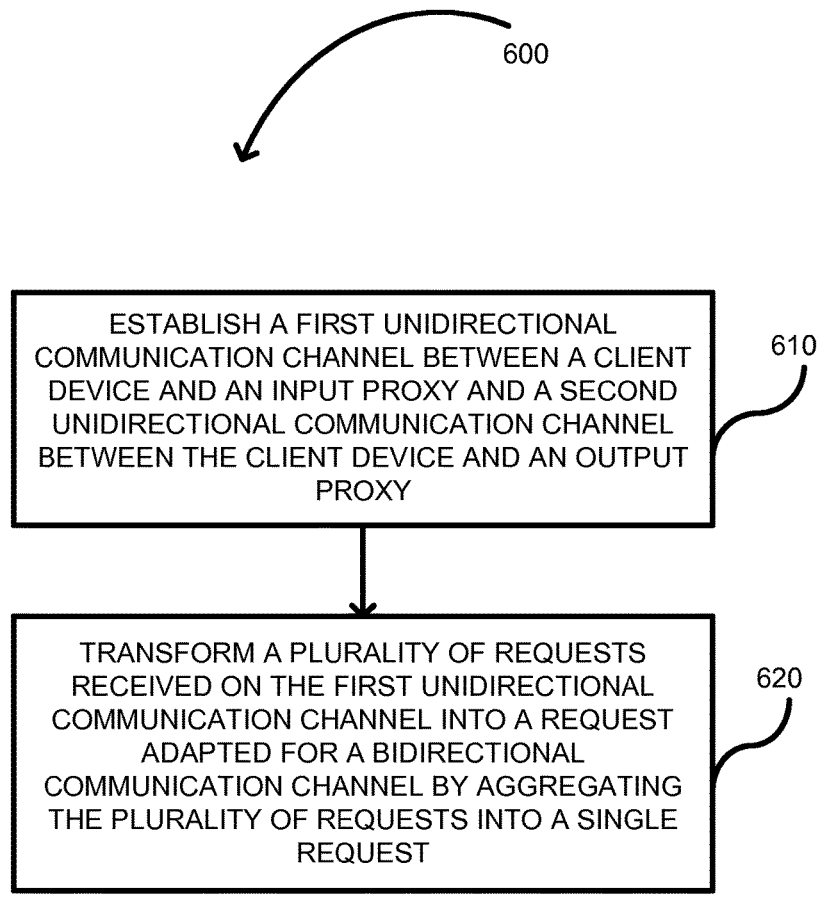
FIG. 6 shows a flowchart of a method for translating requests and responses between different protocols according to one embodiment.

FIG. 6 is a flowchart 600 of a method for translating requests between protocols. In process block 610, a first unidirectional communication channel is established between the client device and the input proxy and a second unidirectional communication channel is established between the output proxy and the client device. The unidirectional communication channels can support unidirectional communication protocols for transmitting requests and responses. Typically, the channels remain active while a user is logged into the client device. In process block 620, a plurality of requests can be received and transformed into a request adapted for a bidirectional communication channel. In particular, multiple of the requests transmitted using the unidirectional communication protocol can be aggregated into a single request formatted for the bidirectional communication protocol. Such aggregation can be accomplished in an automated fashion using the input proxy.

Figure 7:
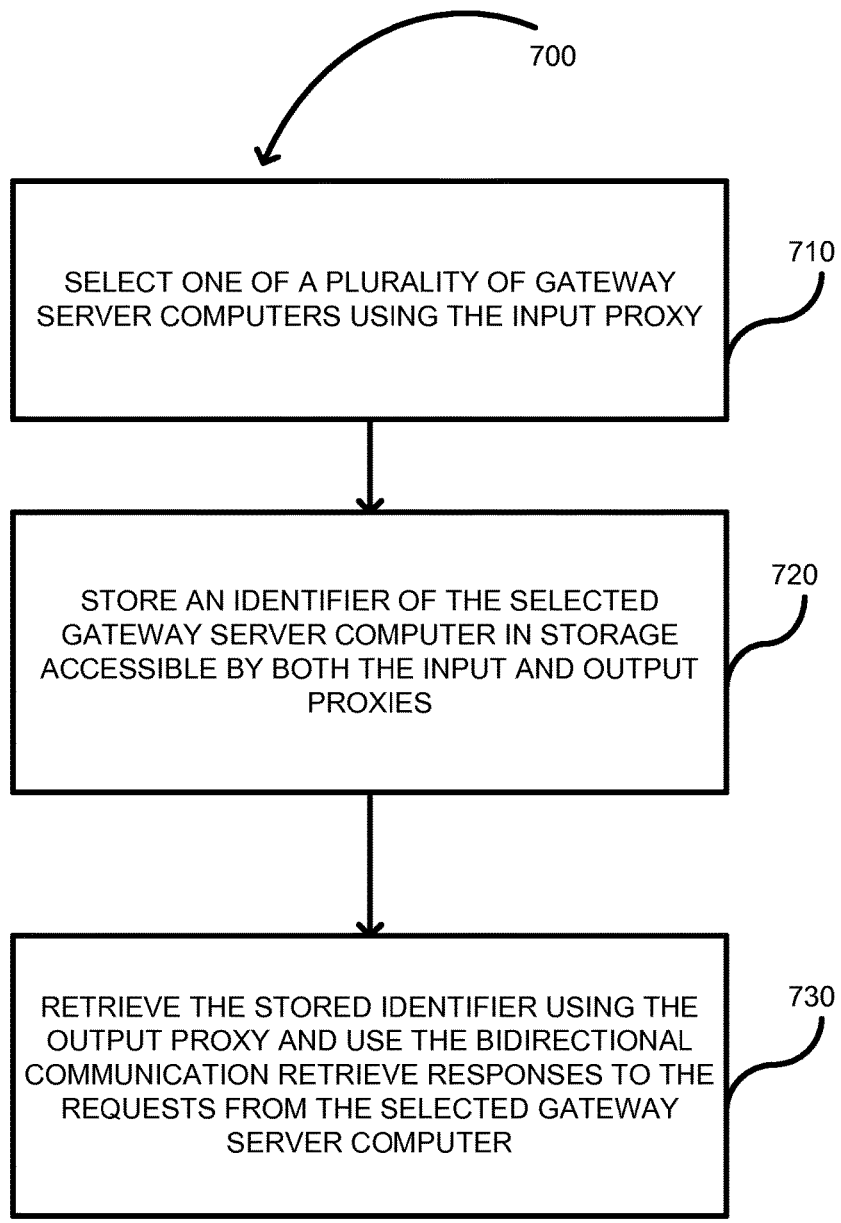
FIG. 7 shows a flowchart of a method for translating requests and responses between different protocols according to another embodiment.

FIG. 7 is a flowchart 700 of a method showing additional process blocks that can be used. In process block 710, an input proxy selects one of a plurality of gateway server computers. After a plurality of requests are received by a client device, the input proxy can select a gateway server computer to which the requests are forwarded. Once the input proxy selects the gateway server computer, it stores an identifier of the gateway server computer, such as a GUID or address, in storage accessible by both the input and output proxies. The storage can be memory or disk on the server computer itself that is executing the proxies, or the storage can be external to the one or more server computers executing the proxies. In process block 730, the output proxy can monitor the shared storage for a change. Once a detection is made, the output proxy can establish a bidirectional communication channel with the gateway server computer using the identifier. A GET request can be used to retrieve the responses from the gateway server computer, for example. Once received, the responses can be parsed and transmitted to the client device. Thus, using the shared storage, the input and output proxies can correlate the requests and responses so as to optimize network bandwidth, such as by having short-lived communication sessions.

Figure 8:
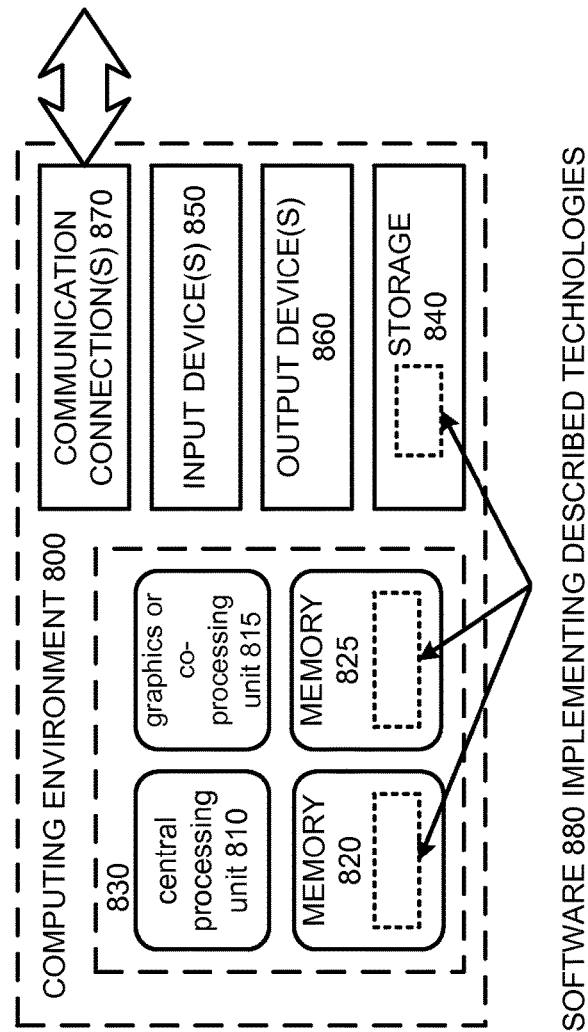
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of translating between different protocols, the method comprising:
providing an input proxy and an output proxy on one or more server computers coupled between a client device and a plurality of candidate gateway server computers;
establishing a first unidirectional communication session between the client device and the input proxy and a second communication session between the client device and the output proxy, wherein at least the first unidirectional communication session remains open for a first period of time;
receiving a plurality of requests from the client device on the input proxy during the first unidirectional communication session using a first protocol, wherein each of the plurality of requests includes a header and data portion;
aggregating the plurality of requests into a single request, wherein aggregating the plurality of requests includes adding a respective header associated with a second protocol and including the plurality of requests with their associated headers in a data portion of the single request;
selecting one of the plurality of candidate gateway server computers;
establishing a third communication session using the second protocol between the input proxy and the selected gateway server computer, wherein the third communication session remains open for a second period of time, less than the first period of time; and
transmitting the single request from the input proxy to the selected gateway server computer using the second protocol.

2. The method of claim 1, wherein the single request is unwrapped into the plurality of requests that are processed separately.

3. The method of claim 1, wherein the first protocol uses a Remote Procedure Call (RPC) protocol and the second protocol is Hypertext Transfer Protocol (HTTP).

4. The method of claim 1, wherein the plurality of gateway server computers are candidate gateway server computers and the method further includes selecting, by the input proxy, the selected gateway server computer.

5. The method of claim 1, further including retrieving a plurality of responses to the plurality of requests, aggregating the responses into a single response, and parsing the single response using the output proxy to separate the plurality of responses for communication back to the client device using the first protocol.

6. The method of claim 5, further including storing, by the input proxy, an identifier of the selected gateway server computer, retrieving the stored identifier by the output proxy and retrieving, by the output proxy, the responses from the identified selected gateway server computer.

7. A computer-readable storage medium including instructions that upon execution cause a computer system to:
establish at least a first unidirectional communication channel between a client device and an input proxy, and at least a second unidirectional communication channel between the client device and an output proxy, wherein the input proxy and the output proxy are coupled in parallel to the client device, at least the first unidirectional communication channel for communicating using a unidirectional communication protocol; and
transform a plurality of requests received on the first unidirectional communication channel, which remains open during a period of time that the plurality of requests are received, into a request adapted for a bidirectional communication channel by aggregating the plurality of requests into a single request associated with a bidirectional communication protocol.

8. The computer-readable storage medium according to claim 7, wherein the instructions, upon execution, further cause the computer system to:
select, by the input proxy, one of a plurality of gateway server computers and store an identifier of the selected gateway server computer in storage shared between the input proxy and output proxy; and
retrieve the stored identifier using the output proxy, establish a bidirectional communication channel between the output proxy and the gateway server computer associated with the identifier and use the bidirectional communication protocol to retrieve a plurality of responses from the selected gateway server computer.

9. The computer-readable storage medium according to claim 8, wherein the instructions, upon execution, further cause the computer system to:

aggregate the plurality of responses into a single response;
transmit the single response to the output proxy;
extract the plurality of responses from the single response; and
transmit the plurality of responses over the second unidirectional communication channel.

10. The computer-readable storage medium according to claim 7, wherein the instructions, upon execution, further cause the computer system to:
maintain the first unidirectional communication channel open for a first period of time while the plurality of requests are transmitted on the first unidirectional communication channel;
upon aggregating the plurality of requests into the single request, open a bidirectional communication channel for a second period of time, shorter than the first period of time, and transmit the single request using the bidirectional communication protocol.

11. The computer-readable storage medium according to claim 7, wherein the unidirectional communication protocol is a Remote Procedure Call (RPC) protocol and the bidirectional communication protocol is a Hypertext Transfer Protocol (HTTP).

12. The computer-readable storage medium according to claim 7, wherein the aggregation of the plurality of requests into the single request includes storing the plurality of requests in a data section of the single request and adding a header associated with the bidirectional communication protocol.

13. The computer-readable storage medium according to claim 7, wherein the instructions, upon execution, further cause the computer system to:
maintain the second unidirectional communication channels open throughout transmission of the plurality of requests and receipt of responses;
open the bidirectional communication channel to transmit the single request and then close the bidirectional communication channel prior to receiving the responses.

14. The computer-readable storage medium according to claim 7, wherein the instructions, upon execution, further cause the computer system to:
select one of a plurality of gateway servers to which the single request is sent;
store, using the input proxy, an address of a selected server computer in a shared storage area;
monitor, using the output proxy, the shared storage area for the address to appear; and
transmit a request from the output proxy to the selected server computer using the address.

15. A system for translating requests received from a client device to a multi-tenant environment, comprising:
an input proxy coupled to a network, the input proxy for receiving a plurality of requests from the client device on a first unidirectional communication channel and for transmitting a single request on a first bidirectional communication channel, the single request including a header and a data portion that includes an aggregation of the plurality of requests, wherein the first unidirectional communication channel remains open without closing while receiving the plurality of requests;
an output proxy coupled to the network for receiving the plurality of responses on a second bidirectional communication channel and for sending responses to the plurality of requests to the client device on a second unidirectional communication channel;
a gateway server computer coupled to the input proxy and the output proxy for receiving the single request and transmitting the single request to the multi-tenant environment, wherein the single request is unwrapped by the multi-tenant environment into the plurality of requests that are processed separately, and for delivering the plurality of responses from the multi-tenant environment to the output proxy; and
a database shared between the input proxy and the output proxy for storing an address of the gateway server computer.

16. The system of claim 15, wherein the unidirectional communication channel uses a unidirectional communication protocol, which is a Remote Procedure Call (RPC) protocol and the bidirectional communication channel uses the bidirectional communication protocol, which is a Hypertext Transfer Protocol (HTTP).

17. The system of claim 15, wherein the gateway server computer is one of a plurality of candidate gateway server computers and wherein the input proxy is configured to select the gateway server computer from the plurality of candidate gateway server computers.

18. The system of claim 17, wherein the input proxy is configured to store the address of the selected gateway server computer in the database.

19. The system of claim 15, wherein the second unidirectional communication channel is configured to remain open during a period of time that the plurality of responses are received.

* * * * *